June 24, 1958
C. A. WOODWARD
2,840,416
GLASS RUN FOR AUTOMOBILE WINDOWS
Filed Oct. 10, 1956
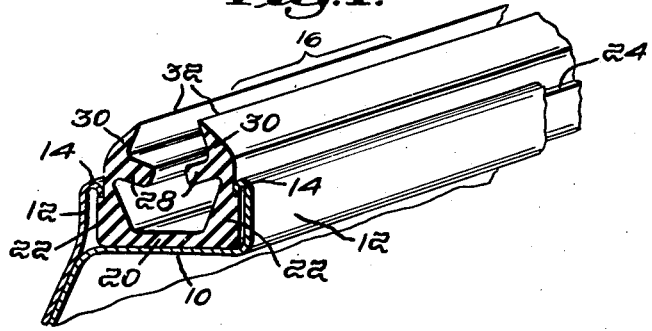
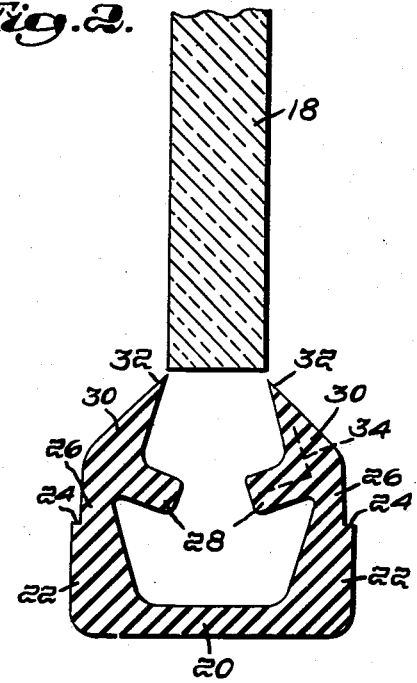
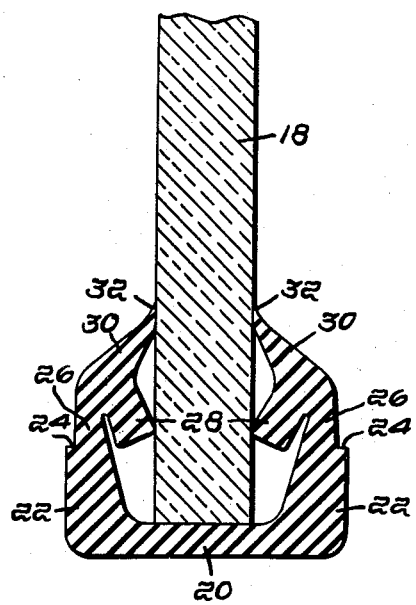
Inventor:
Clement A. Woodward,
by Emery, Booth, Townsend, Miller
& Wachner Attys

United States Patent Office 2,840,416
Patented June 24, 1958

2,840,416

GLASS RUN FOR AUTOMOBILE WINDOWS

Clement A. Woodward, Harvard, Mass., assignor to United-Carr Fastener Corporation, Cambridge, Mass., a corporation of Delaware Application October 10, 1956, Serial No. 615,152

3 Claims. (Cl. 296—44.5)

This invention relates to a glass run for automobile windows or the like. A glass run is secured to a window frame and receives the ends of the glass, usually directly, there being no sash. The word "run" comes from its use with sliding windows such as those in automobile doors where the edge of the glass slides in the run and it is convenient to use that word, although the construction might well be used for a fixed window or along the header strip of a door frame to receive the upper edge of the glass.

Hitherto glass runs as most frequently used on automobiles have been faced with pile fabric, which presents a soft cushioning surface to the glass, the pile serving as a weatherstripping, excluding air, dust and water. At the high speeds of travel now customary, such devices are not effective and in particular water is driven around the edge of the glass into the interior of the body and into the internal spaces of the door.

The object of the invention is to provide a device to meet such conditions and one having other advantages and which may be produced and installed cheaply and effectively.

My invention will be well understood by reference to the following description taken in connection with the accompanying drawings wherein:

Fig. 1 is a fragmentary perspective view showing a portion of the window frame with the glass channel installed therein, the glass not being shown;

Fig. 2 is a cross section of the run on a larger scale and a glass in adjacency thereto, in position to be entered into the run by a downward movement of approach viewing the figure; and Fig. 3 is a similar view showing the glass inserted.

Referring to Fig. 1 I there show a portion of a window casing having a generally channel form with a base or web 10 and upstanding flanges 12 which herein have bent back edges 14 forming inwardly facing shoulders for a purpose to be described. The glass run, denoted as a whole by the numeral 16, is received in this channel and the edge of the glass 18 in turn received in the run as seen in Fig. 3.

The glass run is herein formed from plastic, using that word in its well understood, present day popular sense, and referring to an organic polymeric material, and in particular from one which is thermoplastic. With such thermoplastic material the glass run may be produced initially as a strip, if desired of practically indefinite length, by the process of extrusion since, as will appear, the cross section of the strip is uniform at all points along its length.

The plastic used is one which in the finished form will be waterproof and weather resistant, and with a substantially imporous surface. It should also be tough and stable in form, yet pliable in the sense that it is firmly yielding and resilient, although with a somewhat deliberate elastic response. Desirably it should have a low coefficient of friction relative to glass. A preferred material is a suitable formulation of polyethylene. Additives, such as plasticizers and pigments, may be used in accordance with the practice of the plastics art.

Referring now to Fig. 2 of the drawings, the run 16 is there seen in its normal, unstressed position, as in Fig. 1. In accordance with the invention the integrally molded glass run is formed with portions which are initially sufficiently widely spaced to permit easy introduction of the glass between the same and means are provided in the path of the edge of the glass entered between them and displaceable thereby to cause inward movement of these portions toward and into contact with the sides of the glass pane. In the embodiment shown the run 16 comprises a channel-shaped body including a web 20 and upstanding flanges 22, having shoulders 24 to cooperate with the retaining shoulders 14 of the window frame, as seen in Fig. 1. The interior side of these flanges 22 may flare outwardly to define a relatively thin section 26 immediately above these shoulders, which constitutes a zone of preferential bending as will be later explained. Distally of these portions is an angular portion of relatively greater thickness and lesser flexibility, comprising generally inwardly extending arms 28 and generally outwardly extending arms 30, the edges of which may be tapered to form flexible extremities 32.

It will be observed from Fig. 2 that the extremities 32 are somewhat more widely spaced than the thickness of the glass 18 and if the glass were moved downwardly from the position shown it would pass freely between them. The arms 28, however, extend into the path of the glass when thus inserted and when they make contact with the glass the angular member on either side consisting of the arms 28 and 30 is tipped inwardly, bending about the relatively flexible zone 26 independently of any deflection of the arms of the angular member itself. In Fig. 2 I have emphasized by means of the dotted line 34 the angular cross section of the portion which thus hinges inwardly about the zone 24. The inwardly extending arms 28 are displaced downwardly and outwardly and the upwardly extending arms 30 inwardly and downwardly, bringing the extremities 32 into contact with the glass. These extremities may yield outwardly because of their taper for yielding sealing engagement against the sides of glass 18 when the latter is bottomed in the channel, as seen in Fig. 3.

The change diagrammed by Figs. 2 and 3 is what would occur when a sliding pane moves into the glass run as, for instance, the upper edge of a window glass as it moves to closed position against the top header. When the glass is moving longitudinally of the channel the change would be progressive, the part engaged by the glass, say the lower portion of a vertically movable half open window would be as shown in Fig. 3 and the part above opposite the open part of the window generally in the position of Fig. 2, and as the glass advanced the edge of the run would be closed against it to the former position. The grip of the tapered edges 32 on the glass will provide engagement therewith over an extended area, to provide an efficient seal against the passage of water, although the pressure need not be such as to interfere with the sliding movement of the glass. They effectively exclude water and sleet which might otherwise penetrate the channel to freeze therein and cause sticking of the window. The arms 28 also form a secondary seal with the glass.

While reference has been made to bending of the parts, the strip has an initial self-maintaining form as seen in Fig. 1. It is not limp and, while it may be temporarily deformed for purposes of installation or to adapt itself to the glass, it returns resiliently within a short period of time to its original shape. The strip may be produced in practically indefinite lengths and cut into suitable lengths for the work at hand, and joined when necessary. Such strips would also have sufficient longitudinal flexibility to permit them to be adapted to curves of considerable radius.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A glass run comprising an elongated strip formed integrally from thermoplastic organic polymeric material, the strip being of uniform cross-sectional contour and comprising a base having flanges of a cross-sectional contour providing a preferential zone of bending remote from the base and outwardly of the zone tapered edge portions normally spaced more widely than the thickness of the glass, there being between said edge portions parts extending inwardly into the path of a glass entered between said edge portions and serving to transmit therefrom a force bending the tapered extremities of said edge portions into contact with the sides of the glass.

2. A glass run comprising an elongated strip formed integrally from thermoplastic organic polymeric material, the strip being of uniform cross-sectional contour and comprising a base having lateral flanges, angular portions connected to said flanges by a reduced neck about which the angular portions may bend substantially as a unit the angular portions having sides extending inwardly toward one another with their extremities spaced a distance less than the thickness of the glass and outwardly extending sides with tapered edges normally spaced a distance greater than the thickness of the glass.

3. A glass run comprising an elongated strip formed integrally from thermoplastic organic polymeric material, the strip being of generally channel form having flanges with yieldable extremities which are normally spaced a distance greater than the thickness of the glass, the interior of the channel having along its flanges integral parts disposed in spaced relation to and above its base in the path of the edge of a glass entered between the extremities and displaceable thereby to cause inward movement of said extremities toward one another and against the sides of the glass.

References Cited in the file of this patent

UNITED STATES PATENTS

| 2,194,109 | Bader | Mar. 19, 1940 |

FOREIGN PATENTS

| 1,106,199 | France | July 13, 1955 |
| 569,954 | Great Britain | June 15, 1945 |